(12) United States Patent
Lu et al.

(10) Patent No.: US 12,154,261 B2
(45) Date of Patent: Nov. 26, 2024

(54) IMAGE DEFECT DETECTION METHOD, ELECTRONIC DEVICE AND READABLE STORAGE MEDIUM

(71) Applicant: HON HAI PRECISION INDUSTRY CO., LTD., New Taipei (TW)

(72) Inventors: Chih-Te Lu, New Taipei (TW); Wan-Jhen Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 342 days.

(21) Appl. No.: 17/896,663

(22) Filed: Aug. 26, 2022

(65) Prior Publication Data
US 2023/0401691 A1    Dec. 14, 2023

(30) Foreign Application Priority Data

Jun. 9, 2022   (CN) .......................... 202210654056.3

(51) Int. Cl.
*G06T 7/00* (2017.01)
*G06T 5/50* (2006.01)
(Continued)

(52) U.S. Cl.
CPC .............. *G06T 7/0008* (2013.01); *G06T 5/50* (2013.01); *G06T 7/11* (2017.01); *G06V 10/28* (2022.01);
(Continued)

(58) Field of Classification Search
CPC . G06T 7/0008; G06T 5/50; G06T 7/11; G06T 2207/20224; G06T 7/0002;
(Continued)

(56) References Cited

U.S. PATENT DOCUMENTS

| | | | |
|---|---|---|---|
| 2020/0111217 A1* | 4/2020 | Yokoyama | ............. G06N 3/047 |
| 2020/0311895 A1* | 10/2020 | Sakurai | ..................... G06T 5/50 |
| 2023/0090743 A1* | 3/2023 | Pinto | ......................... G06T 7/10 |
| | | | 382/141 |

FOREIGN PATENT DOCUMENTS

| | | |
|---|---|---|
| TW | 201514474 | 4/2015 |
| TW | 202125330 | 7/2021 |

(Continued)

*Primary Examiner* — Umair Ahsan
(74) *Attorney, Agent, or Firm* — ScienBiziP, P.C.

(57) ABSTRACT

An image defect detection method applied to an electronic device is provided. The method includes dividing a detecting image into a plurality of detecting areas, generating a detection accuracy value for each detecting area based on a defective image and a non-defective image, and obtaining a plurality of detection accuracy values. An autoencoder is selected for each detection accuracy value. A model corresponding to each detecting area is obtained by training the autoencoder based on the non-defective image. A plurality of reconstructed image blocks is obtained by inputting each of a plurality of detecting blocks into the corresponding model, and a reconstruction error value between each reconstructed image block and the corresponding detecting block is obtained. A detection result of a product contained in the image to be detected is obtained based on the reconstruction error value corresponding to each detecting block.

20 Claims, 3 Drawing Sheets

(51) Int. Cl.
*G06T 7/11* (2017.01)
*G06V 10/28* (2022.01)
*G06V 10/74* (2022.01)

(52) U.S. Cl.
CPC .. *G06V 10/761* (2022.01); *G06T 2207/20224* (2013.01); *G06V 2201/07* (2022.01)

(58) Field of Classification Search
CPC ...... G06T 7/001; G06V 10/28; G06V 10/761; G06V 2201/07; G06V 10/52; G06N 3/08
See application file for complete search history.

(56) References Cited

FOREIGN PATENT DOCUMENTS

| | | |
|---|---|---|
| TW | 202127371 | 7/2021 |
| TW | I748828 | 12/2021 |

\* cited by examiner

IMAGE DEFECT DETECTION METHOD, ELECTRONIC DEVICE AND READABLE STORAGE MEDIUM

FIELD

The present disclosure relates to image processing technology, in particular to an image defect detection method, an electronic device, and a readable storage medium.

BACKGROUND

In a current method of detecting defects in products in an image, misjudgment or misdetection may occur if there are a plurality of defects of different sizes appearing in the image. Therefore, a low accuracy of defect detection is the result.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
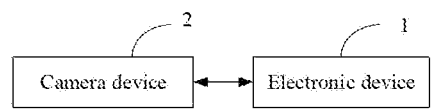
FIG. 1 is an environment diagram of an embodiment of an image defect detection method.

FIG. 1 is an application environment diagram of one embodiment of an image defect detection method of the present disclosure. The image defect detection method can be applied to an electronic device 1. The electronic device 1 can communicate with a camera device 2, and the camera device 2 may be a camera or other device for capturing images. For example, the camera device 2 can take images of a plurality of products having defects and obtain a plurality of images (hereinafter named as "defective images"). The camera device 2 can take images of a plurality of products having no defects and obtain a plurality of images (hereinafter named as "non-defective images"). With or without defects, the products may be devices such as mobile phones, computer hosts, or other suitable devices.

The electronic device 1 is a device that can automatically perform numerical calculation and/or information processing according to pre-set or stored instructions, and its hardware includes, but is not limited to, a microprocessor, an application specific integrated circuit (ASIC), a field-programmable gate array (FPGA), a digital signal processor (DSP), an embedded equipment, and so on.

The electronic device 1 can be any electronic product that can interact with a user. For example, the electronic device 1 can be a personal computer, a tablet computer, a smart phone, a personal digital assistant (PDA), a game console, and an internet protocol television (IPTV), a smart wearable device, etc.

The electronic device 1 may also include network equipment and/or user equipment. Wherein, the network device includes, but is not limited to, a network server, a server group formed by a plurality of network servers, or a cloud formed by a large number of hosts or network servers based on cloud computing.

The network where the electronic device 1 is located includes, but is not limited to, the Internet, a wide area network, a metropolitan area network, a local area network, a virtual private network (VPN), and the like.

Figure 2:
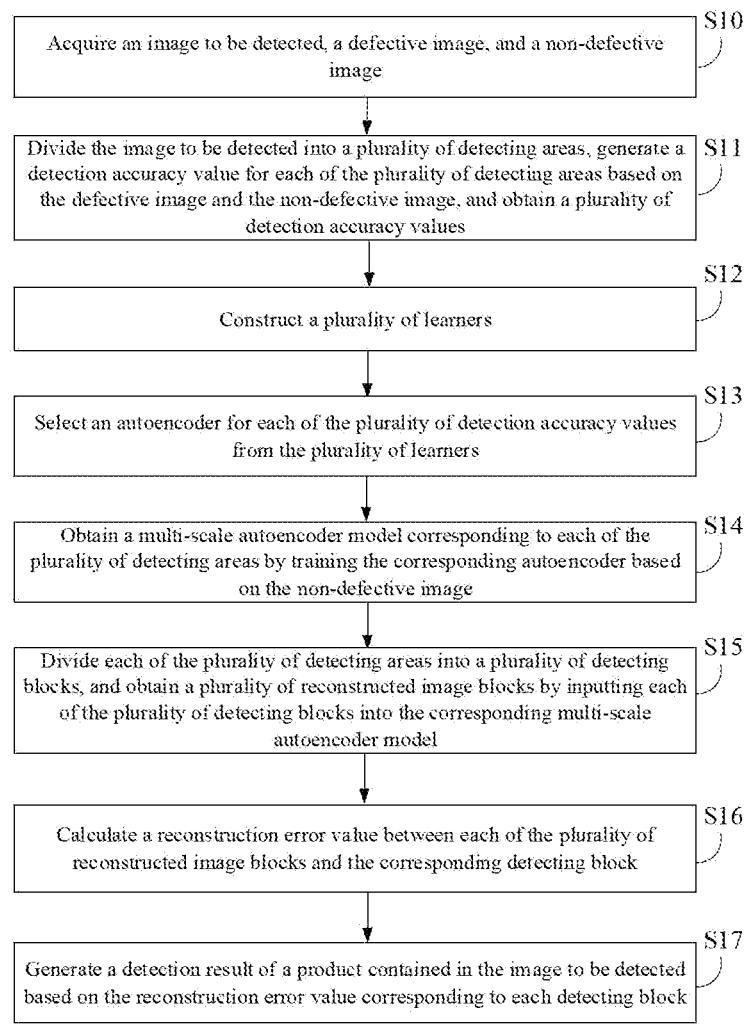
FIG. 2 is a flowchart of an embodiment of a method for detecting defects in an image of a product.

FIG. 2 is a flowchart of one embodiment of an image defect detection method of the present disclosure. According to different requirements, a sequence of each block in this flowchart can be adjusted according to actual requirements, and some flocks can be omitted. The execution body of this method can be an electronic device, such as an electronic device 1 shown in FIG. 4.

At block S10, the electronic device 1 acquires an image of a product to be detected (hereinafter named as "image to be detected"), a defective image, and a non-defective image.

In one embodiment, the defective image refers to an image of the product having defects. The non-defective image refers to an image of the product having no defect. The product can be a mobile phone case, or other suitable product such as a water cup. When the product is the mobile phone case, the defects may refer to scratches or other kinds defects on the mobile phone case. When the product is the water cup, the defects may refer to chromatic aberration, etc. The defective image can be used to generate a reconstructed image, and the non-defective image can be used to train an autoencoder. It can be understood that the image to be detected, the defective image, and the non-defective image in this disclosure are images of a same type of product. For example, when the image to be detected is an image of a water cup, the defective image is an image of a water cup with chromatic aberration, and the non-defective image is an image of a water cup without chromatic aberration.

In one embodiment, the acquiring of the image to be detected, the defective image, and the non-defective image includes:

Acquiring the image to be detected by controlling the camera device to capture an image of the product to be detected at a predetermined position and a predetermined angle;

Acquiring the defective image and the non-defective image from a first database, wherein, the defective image is an image of the product having defects captured at the predetermined position and the predetermined angle, and the non-defective image is an image of the product having no defects captured at the predetermined position and the predetermined angle.

As can be seen from the above, the image to be detected, the defective image and the non-defective image are images of the same type of product captured at a same position and a same angle.

At block S11, the electronic device divides the image to be detected into a plurality of areas to be detected (hereinafter named as "detecting areas"), generates a value of detection accuracy (hereinafter named as "detection accuracy value") for each of the plurality of detecting areas based on the defective image and the non-defective image, and obtains a plurality of detection accuracy values.

In one embodiment, each of the plurality of detecting areas refers to an area that needs to be detected for a presence of defects.

In one embodiment, the generating of the detection accuracy value for each of the plurality of areas based on the defective image and the non-defective image includes:

Dividing the defective image into a plurality of areas (hereinafter named as "defective areas"), and dividing the non-defective image into a plurality of areas (hereinafter named as "non-defective areas"); dividing each of the plurality of defective areas into a plurality of blocks (hereinafter named as "defective blocks"); dividing each of the plurality of non-defective areas into a plurality of blocks (hereinafter named as "non-defective blocks"); for each of the plurality of defective areas, calculating a value of similarity (hereinafter named as "similarity value") between each of the plurality of defective blocks and a corresponding non-defective block and obtaining a plurality of similarity values; calculating an average value of the plurality of similarity values, and determining the calculated average value as being a target average value corresponding to each defective area, therefore obtaining a plurality of target average values each of which is corresponding to one of the plurality of defective areas; generating a range of parameters (hereinafter named as "parameter range") of each defective area based on the target average value corresponding to each defective area; and determining the parameter range of each defective area as the detection accuracy value of a corresponding detecting area.

In one embodiment, there are various ways for the electronic device to divide the image to be detected into the plurality of detecting areas. For example, the electronic device divides the image to be detected into an upper half area and a lower half area. The upper half area and the lower half area are two detecting areas of the image to be detected. It should be noted that the electronic device divides the defective image and the non-defective image in the same manner as dividing the image to be detected. It should be noted that a certain defective area corresponding to a certain non-defective area means that a position of the certain defective area in the defective image and a position of the certain non-defective area in the non-defective image are the same. Similarly, a certain defective area corresponding to a certain detecting area means that a position of the certain defective area in the defective image and a position of the certain detecting area in the image to be detected are the same.

In addition, in other embodiments of the present disclosure, the electronic device can preset a rule for division (hereinafter named as "division rule"), and divides each of the defective image, the non-defective image, and the image to be detected according to the preset division rule. For example, the electronic device can preset the division rule according to parameters such as a preset size and a preset position, and the preset position may be determined based on a pre-establish coordinate system. For example, the electronic device can establish a two-dimensional coordinate system by setting a center point of an image or any other point of the image as an origin, and setting directions of a horizontal axis and a vertical axis. It should be noted that a certain defective area corresponding to a certain non-defective area means that positions of the certain defective area and the certain non-defective area in the coordinate system are same. Similarly, a certain defective area corresponding to a certain detecting area means that positions of the certain defective area and the certain detecting area in the coordinate system are same.

The target average value corresponding to each defective area is a ratio between the plurality of similarity values corresponding to each defective area and a number of the plurality of defective blocks in each defective area, and a value range of each similarity value is [0, 1].

Specifically, a formula of calculating the similarity value may be:

$$SSIM(x, y) = \frac{(2\mu_x\mu_y + c_1)(2\sigma_{xy} + c_2)}{(\mu_x^2 + \mu_x^2 + c_1)(\sigma_x^2 + \sigma_y^2 + c_2)};$$

$$c_1 = (K_1 L)^2;$$

$$c_2 = (K_2 L)^2;$$

Wherein, SSIM(x, y) represents the similarity value, x represents the defective block, y represents the non-defective block corresponding to the defective block, $\mu_x$ represents an average grayscale value of the defective block, $\mu_y$ represents an average grayscale value of the corresponding non-defective block, $\sigma_x$ represents a grayscale standard deviation of the defective block, $\sigma_y$ represents a grayscale standard deviation of the corresponding non-defective block, and $\sigma_{xy}$ represents a grayscale value covariance between the defective block and the corresponding non-defective block, $c_1$ and $c_2$ represent parameters that maintain a denominator in the similarity value not to be zero, and L represents a dynamic range of a pixel value of each pixel point in the defective block, $K_1$ and $K_2$ represent preset constants, and $K_1 < 1$, $K_2 < 1$.

Specifically, the generating of the parameter range of each defective area based on the target average value corresponding to each defective area includes:

Sorting the plurality of target average values in an ascending order; performing a generation operation by generating a first interval according to zero and a second target average value of the plurality of target average values, and determining the first interval as being the parameter range of the defective area corresponding to a first target average value of the plurality of target average values; performing a next generation operation by generating a second interval according to the second target average value and a third target average value of the plurality of target average values, and determining the second interval as being the parameter range of the defective area corresponding to the second target average value; repeating the generation operations until the parameter range of the defective area corresponding to each of the plurality of target average values except for a last target average value has been determined; and generating a last interval according to the last target average value and a value one, and determining the last interval as being the parameter range of the defective area corresponding to the last target average value.

For example, the electronic device divides the image to be detected into a first detecting area, a second detecting area and a third detecting area, the electronic device correspondingly divides the defective image into a first defective area, a second defective area and a third defective area, and divides the non-defective image into a first non-defective area, a second non-defective area and a third non-defective area. The electronic device divides each of the three defective areas into a plurality of defective blocks, divides each of the three non-defective area into a plurality of non-defective blocks, and calculates a similarity value between each defective block and a corresponding non-defective block, calculates an average value of the similarity values corresponding to each defective area, and obtains a target average value corresponding to each defective area. If the target average value corresponding to the first defect area equals 0.4, the target average value corresponding to the second defect area equals 0.5, and the target average value corresponding to the third defect area equals 0.8, the electronic device generates a first interval [0, 0.5) that does not include 0.5 according to zero and 0.5 (i.e., the second target average value), and the electronic device determines the first interval [0, 0.5) as being a first parameter range of the first defective area. Similarly, the electronic device generates a second interval [0.5, 0.8) that does not include 0.8 according to 0.5 (i.e., the second target average value) and 0.8 (i.e., the third target average value), and determines the second interval [0.5, 0.8) as being a second parameter range of the second defective area. The electronic device generates a last interval [0.8, 1] according to 0.8 (i.e., the third target average value) and the value one, and determines the last interval [0.8, 1] as a third parameter range of the third defective area. The electronic device determines the parameter range of each defective area as being the detection accuracy value of each corresponding detecting area. For example, the electronic device determines the first parameter range of the first defective area as being the detection accuracy value of the first detecting area; determines the second parameter range of the second defective area as being the detection accuracy value of the second detecting area; and determines the third parameter range of the third defective area as being the detection accuracy value of the third detecting area.

Through the above embodiment, the similarity value between each defective area and the corresponding non-defective area is calculated, and the similarity value is used as the detection accuracy value corresponding to each detecting area. The electronic device can preliminarily determine whether each detecting area exists defect according to the corresponding detection accuracy value. The smaller the detection accuracy value, the greater the possibility of a defect in the detecting area. Because the target average value can represent a size of the defect in the corresponding defective area, so the plurality of detection accuracy values can comprehensively represent the size of each defect in each detecting area.

At block S12, the electronic device constructs a plurality of learners.

In one embodiment, the plurality of learners may be used to generate reconstructed image blocks according to input image blocks.

In one embodiment, the constructing of the plurality of learners includes:

Constructing latent spaces with a plurality of sizes; obtaining a plurality of operation results by performing operations according to each of the plurality of sizes and a size (hereinafter named as "image size") of ach detecting block; for each of the plurality of sizes, constructing a corresponding number of hidden layers as an encoder according to the plurality of operation results, and constructing a corresponding number of operation layers as a decoder according to the plurality of operation results; generating a learner according to the encoder, the latent space and the decoder corresponding to each of the plurality of size, and obtaining the plurality of learners.

Wherein, each hidden layer includes a convolution layer, a batch normalization layer, and an activation function layer; and each operation layer includes a deconvolution layer, the batch normalization layer, and the activation function layer. The activation function layer can be ReLu.

The latent space refers to a space where extracted image features exist. The plurality of sizes may include 4*4, 8*8, and 16*16.

The image size of the detecting block refers to a number of pixel points included in a horizontal direction and in a vertical direction in the detecting block, the image size can be used to calculate a number of hidden layers in each of the plurality of learners, and the image size may be, 64*64, 32*32.

Specifically, the constructing of latent spaces with the plurality of sizes includes:

Determining the plurality of sizes, constructing a latent space according to each of the plurality of sizes and obtaining the plurality of latent spaces.

Specifically, the obtaining of the plurality of operation results by performing operations according to each of the plurality of sizes and the image size of each detecting block includes:

Obtaining an operation result by performing an iterative division operation based on the image size and a target setting value; if the operation result is different from any one of the plurality of sizes, performing a next iterative division operation, and determining the operation result as being the image size (which may be referred to as "target image size") in a next division operation; dividing the target image size by the target setting value until the operation result is the same as any one of the plurality of sizes, ending the division operation. By performing the iterative division operation, the plurality of operation results equivalent to the plurality of sizes can be obtained. For example, if there are two sizes, the iterative division operation is required for each of the two size. Taking a size A as an example, in the process of iterative division operation, there are a plurality of operation results can be obtained, until an operation result equivalent to the size A is obtained, the iteration is ended. A number of iterations that obtains the operation result equivalent to the size A is determined. The number of iterations is taken as being the number of hidden layers in each learner, and the plurality of operation results are taken as a size of a feature map generated by the encoder.

Wherein, the target setting value can be equal to 2, or 4.

It can be understood that the generation process of the encoder and the decoder are mutually reversible, and the generation process of the decoder is not described in detail in this disclosure.

Figure 3:
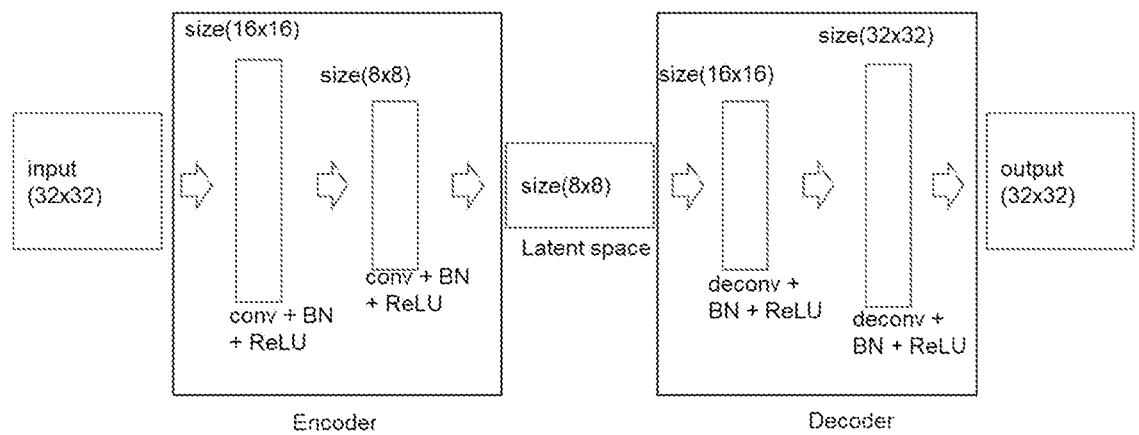
FIG. 3 is a flowchart of an embodiment of a method for generating a learner.

As shown in FIG. 3, it is a schematic diagram of the generation of a learner according to a preferred embodiment of the defect detection method of the present disclosure. It is assumed that the image size is 32*32, the size of the latent space is 4*4, and the target setting value is 2, the first division operation is performed on the image size and the target setting value to obtain a first division result 16*16, the second division operation is performed on the first division result and the target setting value, and the second division result 8*8 is obtained. Because the second division result 8*8 is the same as the size 8*8 of a latent space, the operation is ended. Therefore, a number of operations that obtains the division result same as the size of the latent space is 2. The electronic device constructs two hidden layers as the encoder, and outputs the first operation result 16*16 as a size of the feature map output by the first hidden layer; and outputs the second operation result 8*8 as a size of the feature map output by the second hidden layer. After the above construction, a learner is obtained. The learner includes an encoder, a latent space with a size of 16*16, and a decoder. The encoder includes two hidden layers, wherein a size of the feature map output by the first hidden layer equals the size of the first division result, i.e., 16*16, a size of the feature map output by the second hidden layer equals the second division result, i.e., 8*8, and the decoder includes two operation layers, where, the size of the feature map output by the first operation layer is 16*16, and the size of the feature map output by the second operation layer is 32*32.

Through the above-mentioned embodiment, when each learner is used for feature extraction, a size of the feature extracted by each learner can be controlled according to the operation result. Since the size of the feature extracted by each learner is different, a reconstruction accuracy of each learner is also different.

At block S13, the electronic device selects an autoencoder for each of the plurality of detection accuracy values from the plurality of learners.

In one embodiment, the electronic device selects the autoencoder from the plurality of learners based on the defective blocks and the non-defective blocks.

In one embodiment, the selecting of the autoencoder for each detection accuracy value from the plurality of learners includes:

Determining each defective block in each defective area and the corresponding non-defective block in the non-defective area as being test image blocks; obtaining a marking result of each of the test image blocks; obtaining a plurality of first reconstructed image blocks by inputting each of the test image blocks in each of the plurality of learners; calculating an error value between each of the first reconstructed image blocks and the corresponding test image block; generating a verification result according to the error value and a first preset value; obtaining a comparison result by comparing the verification result with the marking result; calculating a correct rate of each learner according to the comparison result; selecting the learner corresponding to a highest correct rate as the autoencoder corresponding to each defective area; determining the autoencoder corresponding to each defective area as the autoencoder of the detection accuracy value corresponding each defective area.

Wherein, the marking result of each of the test image blocks can be obtained from a predetermined second database, and the marking result of any one of the test image blocks indicates that whether the any one of the test image blocks has defects or has no defects. The electronic device can compare the marking result with the verification result and obtain the comparison result.

The comparison result indicates that the verification result is the same as the marking result, or the verification result is different from the marking result.

The first preset value can be set according to actual requirements, which is not limited in this disclosure.

The correct rate refers to a probability of the same verification result as the marking result.

Specifically, the generating of the verification result according to the error value and the first preset value includes:

If the error value is equal to or greater than the first preset value, determining the test image block corresponding to the error value is defective, or if the error value is less than the first preset value, determines the test image block corresponding to the error value is non-defective.

Specifically, the calculating of the correct rate of each learner according to the comparison result includes:

For each learner, determining the verification result that is the same as the marking result as a target result; counting a first quantity of the target results, and counting a second quantity of the verification results; calculating a ratio of the target results in the verification results according to the first quantity and the second quantity, and determining the calculated ratio as the correct rate of each learner.

Through the above implementation, the defective block and the corresponding non-defective block are used as the test image blocks, and the test image blocks are input into each learner to obtain the plurality of first reconstructed image blocks. The difference between the defective block and the non-defective block is large, so it is more difficult to generate an accurate first reconstructed image block by each learner, so the correct rate can accurately reflect the reconstruction ability of each learner. Selecting the learner corresponding to the maximum accuracy rate as the autoencoder corresponding to each detection accuracy value can improve the reconstruction accuracy of the autoencoder.

At block S14, the electronic device obtains a multi-scale autoencoder model corresponding to each of the plurality of detecting areas by training the corresponding autoencoder based on the non-defective image.

It should be noted that there is a correspondence between each detection accuracy value and each detecting area, and there is a correspondence between each autoencoder and each detection accuracy value, accordingly, there is a correspondence between each autoencoder and each detecting area.

In one embodiment, the multi-scale autoencoder model can be used to generate images similar to the non-defective image.

In one embodiment, the training of the autoencoder is consistent with the generation process of a plurality of reconstruction blocks in the following, so it will not be repeated here.

In this embodiment, the autoencoder is trained by using the non-defective image to generate the multi-scale autoencoder model, and the multi-scale autoencoder model learns the features of the non-defective image.

At block S15, the electronic device divides each of the plurality of detecting areas into a plurality of blocks (hereinafter named as "detecting blocks"), and obtains a plurality of reconstructed image blocks by inputting each of the plurality of detecting blocks into the corresponding multi-scale autoencoder model.

In one embodiment, the obtaining of the plurality of reconstructed image blocks by inputting each of the plurality of detecting blocks into the corresponding multi-scale autoencoder model includes:

Obtaining a feature vector by inputting each detecting block into the hidden layer of the corresponding multi-scale self-encoder model for feature extraction; determining the obtained feature vector as an input vector of a next hidden layer; determining a feature vector output by a last hidden layer as a potential vector corresponding to the image to be detected; obtaining a reconstructed vector output by each operation layer by inputting the potential vector into the operation layer of the corresponding multi-scale autoencoder model, determining the reconstruction vector output by each operation layer as being the input vector of a next operation layer, and obtaining the plurality of reconstructed image blocks by performing conversion on the reconstruction vector output by the last operation layer.

The potential vector refers to a feature obtained by compressing each detecting block by the multi-scale autoencoder model. The reconstructed vector refers to a feature obtained by decompressing the potential vector by the multi-scale autoencoder model. There are various ways to convert the reconstructed vector output by the last operation layer.

Through the above-mentioned embodiment, the corresponding autoencoder is selected according to the detection accuracy value of each detecting area to detect the detecting area. The autoencoder detects each detecting area, and comprehensively detects defects of different sizes in the detecting image, avoiding detection omissions or misjudgments, and improving the accuracy of defect detection.

At block S16, the electronic device calculates a reconstruction error value between each of the plurality of reconstructed image blocks and the corresponding detecting block, such that the reconstruction error value corresponding to each detecting block is obtained.

In one embodiment, the reconstruction error value refers to a difference between each reconstructed image block and the corresponding detecting block, and the reconstruction error value can be used to determine whether the detecting block is defective.

In one embodiment, the calculating of the reconstruction error value between each reconstructed image block and the corresponding detecting block includes:

Obtaining a difference image by performing a subtraction operation between a pixel value of each pixel point in each reconstructed image block and a pixel value of the corresponding pixel point in the detecting block; obtaining a binarized image by binarizing the difference image; extracting the pixel points whose pixel value equals a configuration value from the binarized image as a target area; obtaining the reconstruction error value by calculating an area of the target area.

The configuration value may be set according to actual requirements, which is not limited in this disclosure.

Through the above implementation, the reconstruction error value between each reconstructed image block and the corresponding detecting block can be calculated. Since the multi-scale autoencoder model learns the features of the non-defective image, the plurality of reconstructed image blocks can be regarded as non-defective blocks, the reconstruction error value can accurately reflect the difference between the reconstructed image block and the corresponding detecting block, and whether the image to be detected is defective can be accurately detected by using the reconstruction error value.

At block S17, the electronic device generates a detection result of the product to be detected based on the reconstruction error value corresponding to each detecting block.

In one embodiment, the detection result refers to whether the product to be detected is defective, and a position of a defect when the product is defective.

In one embodiment, the generating of the detection result of the product to be detected based on the reconstruction error value corresponding to each detecting block includes:

Comparing the reconstruction error value corresponding to each detecting block with a second preset value; if the reconstruction error value corresponding to a certain detecting block is greater than the second preset value, determining the certain detecting block as a target image block; locating a position of the target image block in the image to be detected as a position of a defect; and determining that the product to be detected is defective and outputting the position of the defect.

Wherein, the second preset value may be set according to requirement, which is not limited in this disclosure, and the target image block refers to an image block with defects.

Through the above-mentioned embodiment, the detecting block corresponding to the reconstruction error value greater than the second preset value is determined as the target image block. Since the larger the reconstruction error value is, the possibility that the detecting block has defects is greater, by comparing the reconstruction error value with the second preset value, it is possible to quickly and accurately detect whether there is a defect in the product to be detected and locate the position of the defect.

In one embodiment, if the target image block does not exist in the detecting block, the electronic device determines the product to be detected being non-defective and the detecting image being a non-defective image as the detection result.

It can be seen from the above technical solutions that the image to be detected is divided into a plurality of detecting areas, and the detection accuracy value corresponding to each detecting area is generated according to the defective image and the non-defective image. The correspondence between each detecting area and each detection accuracy value is established, a plurality of learners are constructed, and the multi-scale autoencoder model corresponding to each detection accuracy value is selected from the plurality of learners, the corresponding autoencoder model can be selected according to the correspondence. The encoder model detects each detecting area. Since there is an inverse relationship between each detection accuracy value and a size of each defect (i.e., each detection accuracy value can represent the size of the defect in the corresponding detecting area), therefore, inputting the plurality of detecting blocks into the corresponding multi-scale autoencoder model for detection can realize the detection of defects of different sizes in the image to be detected. The size of each defect is represented, and each detecting area is detected by using the autoencoder corresponding to each detection accuracy value, which can comprehensively detect defects of different sizes in the image to be detected, detection omissions or misjudgments can be omitted, and each detecting area is divided into the plurality of detecting blocks and then input into the corresponding multi-scale autoencoder model for detection. Since the image to be detected does not need to be scaled, a loss of the product to be detected is avoided. For the details of the image, by performing defect detection on each detecting block, the image range of each defect detection is reduced. Therefore, the image to be detected can be detected more finely, which improves the accuracy of defect detection.

Figure 4:
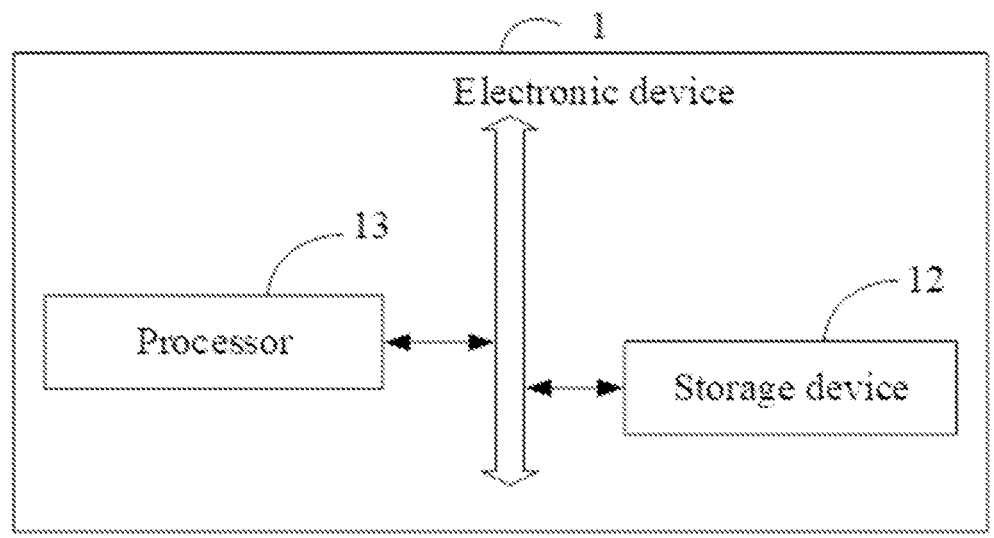
FIG. 4 is a structural diagram of an embodiment of an electronic device.

As shown in FIG. 4, it is a structural diagram of an electronic device according to one embodiment of the image defect detection method of the present disclosure.

In an embodiment of the present disclosure, the electronic device 1 includes, but is not limited to, a storage device 12, a processor 13, and a computer program stored in the storage device 12 and can be executed by the processor 13. For example, the computer program can be a program of image defect detection.

Those skilled in the art can understand that the schematic structural diagram is only an example of the electronic device 1, and does not constitute a limitation on the electronic device 1, and may include more or less components than the one shown, or combine some components, or different components, for example, the electronic device 1 may also include input and output devices, network access devices, buses, and the like.

The processor 13 may be a central processing unit (CPU), or other general-purpose processors, a digital signal processor (DSP), an application specific integrated circuit (ASIC), Field-Programmable Gate Array (FPGA) or other programmable logic devices, discrete gate or transistor logic devices, discrete hardware components, etc. The general-purpose processor can be a microprocessor or the processor can also be any conventional processor, etc. The processor 13 is the computing core and control center of the electronic device 1, and uses various interfaces and lines to connect each part of the electronic device 1.

The processor 13 obtains the operating system of the electronic device 1 and obtains various installed applications. The processor 13 obtains the application program to implement each block in the embodiments of the foregoing image defect detection method, for example, to implement each block shown in FIG. 1.

Exemplarily, the computer program can be divided into one or more modules/units, and the one or more modules/units are stored in the storage device 12 and retrieved by the processor 13 to complete the present disclosure. The one or more modules/units may be a series of computer program instruction segments capable of performing specific functions, and the instruction segments are used to describe the process of acquisition the computer program in the electronic device 1.

The storage device 12 can be used to store the computer programs and/or modules, and the processor 13 executes or obtains the computer programs and/or modules stored in the storage device 12, and calls up the data stored in the storage device 12, such that various functions of the electronic device 1 are realized. The storage device 12 may mainly include an area for storing programs and an area for storing data, wherein the area for storing programs may store an operating system, an application program required for at least one function (such as a sound playback function, an image playback function, etc.), and the like; the area for storing data may store the data created according to the use of the electronic device 1. In addition, the storage device 12 may include non-volatile storage device such as hard disk, internal memory, plug-in hard disk, smart media card (SMC), Secure digital (SD) card, flash card, at least one disk storage device, flash memory device, or other non-volatile solid state storage device.

The storage device 12 may be an external storage device and/or an internal storage device of the electronic device 1. Further, the storage device 12 may be a storage in physical form, such as a memory stick, a trans-flash card, and the like.

If the modules/units integrated in the electronic device 1 are implemented in the form of software functional units and sold or used as independent products, they may be stored in a computer-readable storage medium. Based on this understanding, the present disclosure can implement all or part of the processes in the methods of the above embodiments, and can also be completed by instructing the relevant hardware through a computer program. The computer program can be stored in a computer-readable storage medium, and when the computer program is acquired by the processor, the blocks of the foregoing method embodiments can be implemented.

Wherein, the computer program includes computer program code, and the computer program code may be in the form of source code, object code, obtainable file or some intermediate form, and the like. The computer-readable medium may include: any entity or device capable of carrying the computer program code, recording medium, U disk, removable hard disk, magnetic disk, optical disk, computer memory, read-only memory (ROM).

With reference to FIG. 2, the storage device 12 in the electronic device 1 stores a plurality of instructions to implement the image defect detection method, and the processor 13 can acquire the plurality of instructions to implement processes of: acquiring an image to be detected, a defective image, and a non-defective image; dividing the image to be detected into a plurality of detecting areas, generating a detection accuracy value for each of the plurality of detecting areas based on the defective image and the non-defective image, and obtaining a plurality of detection accuracy values; constructing a plurality of learners; selecting an autoencoder for each of the plurality of detection accuracy values from the plurality of learners; obtaining a multi-scale autoencoder model corresponding to each of the plurality of detecting areas by training the corresponding autoencoder based on the non-defective image; dividing each of the plurality of detecting areas into a plurality of detecting blocks, and obtaining a plurality of reconstructed image blocks by inputting each of the plurality of detecting blocks into the corresponding multi-scale autoencoder model; calculating a reconstruction error value between each of the plurality of reconstructed image blocks and the corresponding detecting block; generating a detection result of a product contained in the image to be detected based on the reconstruction error value corresponding to each detecting block.

Specifically, for the specific implementation method of the above-mentioned instruction by the processor 13, reference may be made to the description of the relevant blocks in the corresponding embodiment of FIG. 1, and details are not repeated.

In the several embodiments provided in this disclosure, it should be understood that the devices and methods disclosed can be implemented by other means. For example, the device embodiments described above are only schematic. For example, the division of the modules is only a logical function division, which can be implemented in another way.

The modules described as separate parts may or may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of unction modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. An image defect detection method applied to an electronic device, the method comprising:
   acquiring an image to be detected, a defective image, and a non-defective image;
   dividing the image to be detected into a plurality of detecting areas, generating a detection accuracy value for each of the plurality of detecting areas based on the defective image and the non-defective image, and obtaining a plurality of detection accuracy values;
   constructing a plurality of learners;
   selecting an autoencoder for each of the plurality of detection accuracy values from the plurality of learners;
   obtaining a multi-scale autoencoder model corresponding to each of the plurality of detecting areas by training the corresponding autoencoder based on the non-defective image;
   dividing each of the plurality of detecting areas into a plurality of detecting blocks, and obtaining a plurality of reconstructed image blocks by inputting each of the plurality of detecting blocks into the corresponding multi-scale autoencoder model;
   calculating a reconstruction error value between each of the plurality of reconstructed image blocks and the corresponding detecting block;
   generating a detection result of a product contained in the image to be detected based on the reconstruction error value corresponding to each detecting block.

2. The image defect detection method according to claim 1, wherein generating the detection accuracy value for each of the plurality of areas based on the defective image and the non-defective image comprises:
   dividing the defective image into a plurality of defective areas, and dividing the non-defective image into a plurality of non-defective areas;
   dividing each of the plurality of defective areas into a plurality of defective blocks; and dividing each of the plurality of non-defective areas into a plurality of non-defective blocks;
   for each of the plurality of defective areas, calculating a similarity value between each of the plurality of defective blocks and a corresponding non-defective block and obtaining a plurality of similarity values;
   calculating an average value of the plurality of similarity values, and determining the calculated average value as being a target average value corresponding to each defective area, therefore obtaining a plurality of target average values each of which is corresponding to one of the plurality of defective areas;
   generating a parameter range of each defective area based on the target average value corresponding to each defective area; and
   determining the parameter range of each defective area as the detection accuracy value of a corresponding detecting area.

3. The image defect detection method according to claim 2, wherein selecting the autoencoder for each detection accuracy value from the plurality of learners comprises:
   determining each defective block in each defective area and the corresponding non-defective block in the non-defective area as being test image blocks;
   obtaining a marking result of each of the test image blocks;
   obtaining a plurality of first reconstructed image blocks by inputting each of the test image blocks in each of the plurality of learners;
   calculating an error value between each of the first reconstructed image blocks and the corresponding test image block;
   generating a verification result according to the error value and a first preset value; obtaining a comparison result by comparing the verification result with the marking result;
   calculating a correct rate of each learner according to the comparison result;
   selecting the learner corresponding to a highest correct rate as the autoencoder corresponding to each defective area; and
   determining the autoencoder corresponding to each defective area as the autoencoder of the detection accuracy value corresponding each defective area.

4. The image defect detection method according to claim 3, wherein calculating the correct rate of each learner according to the comparison result comprises:
   for each learner, determining the verification result that is the same as the marking result as a target result;
   counting a first quantity of the target results, and counting a second quantity of the verification results;
   calculating a ratio of the target results in the verification results according to the first quantity and the second quantity; and
   determining the calculated ratio as the correct rate of each learner.

5. The image defect detection method according to claim 1, wherein constructing the plurality of learners comprises:
   constructing latent spaces with a plurality of sizes;
   obtaining a plurality of operation results by performing operations according to each of the plurality of sizes and an image size of each detecting block;
   for each of the plurality of sizes, constructing a corresponding number of hidden layers as an encoder according to the plurality of operation results, and constructing a corresponding number of operation layers as a decoder according to the plurality of operation results; and
   generating a learner according to the encoder, the latent space and the decoder corresponding to each of the plurality of size, and obtaining the plurality of learners.

6. The image defect detection method according to claim 5, wherein obtaining the plurality of reconstructed image blocks by inputting each of the plurality of detecting blocks into the corresponding multi-scale autoencoder model comprises:
   obtaining a feature vector by inputting each detecting block into the hidden layer of the corresponding multi-scale self-encoder model for feature extraction;
   determining the obtained feature vector as an input vector of a next hidden layer;

determining a feature vector output by a last hidden layer as a potential vector corresponding to the image to be detected;

obtaining a reconstructed vector output by each operation layer by inputting the potential vector into the operation layer of the corresponding multi-scale autoencoder model, determining the reconstruction vector output by each operation layer as being the input vector of a next operation layer; and obtaining the plurality of reconstructed image blocks by performing conversion on the reconstruction vector output by the last operation layer.

7. The image defect detection method according to claim 1, wherein calculating the reconstruction error value between each reconstructed image block and the corresponding detecting block comprises:

obtaining a difference image by performing a subtraction operation between a pixel value of each pixel point in each reconstructed image block and a pixel value of the corresponding pixel point in the detecting block;

obtaining a binarized image by binarizing the difference image;

extracting the pixel points whose pixel value equals a configuration value from the binarized image as a target area; and obtaining the reconstruction error value by calculating an area of the target area.

8. The image defect detection method according to claim 1, wherein generating the detection result of the product contained in the image to be detected based on the reconstruction error value corresponding to each detecting block comprises:

comparing the reconstruction error value corresponding to each detecting block with a second preset value;

if the reconstruction error value corresponding to a certain detecting block is greater than the second preset value, determining the certain detecting block as a target image block;

locating a position of the target image block in the image to be detected as a position of a defect; and determining that the product to be detected is defective and outputting the position of the defect.

9. An electronic device comprising:
a storage device;
at least one processor; and
the storage device storing one or more programs, which when executed by the at least one processor, cause the at least one processor to:
acquire an image to be detected, a defective image, and a non-defective image;
divide the image to be detected into a plurality of detecting areas, generate a detection accuracy value for each of the plurality of detecting areas based on the defective image and the non-defective image, and obtain a plurality of detection accuracy values;
construct a plurality of learners;
select an autoencoder for each of the plurality of detection accuracy values from the plurality of learners;
obtain a multi-scale autoencoder model corresponding to each of the plurality of detecting areas by training the corresponding autoencoder based on the non-defective image;
divide each of the plurality of detecting areas into a plurality of detecting blocks, and obtain a plurality of reconstructed image blocks by inputting each of the plurality of detecting blocks into the corresponding multi-scale autoencoder model;
calculate a reconstruction error value between each of the plurality of reconstructed image blocks and the corresponding detecting block; and
generate a detection result of a product contained in the image to be detected based on the reconstruction error value corresponding to each detecting block.

10. The electronic device according to claim 9, wherein the at least one processor generates the detection accuracy value for each of the plurality of areas based on the defective image and the non-defective image by:

dividing the defective image into a plurality of defective areas, and dividing the non-defective image into a plurality of non-defective areas;

dividing each of the plurality of defective areas into a plurality of defective blocks; and dividing each of the plurality of non-defective areas into a plurality of non-defective blocks;

for each of the plurality of defective areas, calculating a similarity value between each of the plurality of defective blocks and a corresponding non-defective block and obtaining a plurality of similarity values;

calculating an average value of the plurality of similarity values, and determining the calculated average value as being a target average value corresponding to each defective area, therefore obtaining a plurality of target average values each of which is corresponding to one of the plurality of defective areas;

generating a parameter range of each defective area based on the target average value corresponding to each defective area; and determining the parameter range of each defective area as the detection accuracy value of a corresponding detecting area.

11. The electronic device according to claim 10, wherein the at least one processor selects the autoencoder for each detection accuracy value from the plurality of learners by:

determining each defective block in each defective area and the corresponding non-defective block in the non-defective area as being test image blocks;

obtaining a marking result of each of the test image blocks;

obtaining a plurality of first reconstructed image blocks by inputting each of the test image blocks in each of the plurality of learners;

calculating an error value between each of the first reconstructed image blocks and the corresponding test image block;

generating a verification result according to the error value and a first preset value; obtaining a comparison result by comparing the verification result with the marking result;

calculating a correct rate of each learner according to the comparison result;

selecting the learner corresponding to a highest correct rate as the autoencoder corresponding to each defective area; and determining the autoencoder corresponding to each defective area as the autoencoder of the detection accuracy value corresponding each defective area.

12. The electronic device according to claim 11, wherein the at least one processor calculates the correct rate of each learner according to the comparison result by:

for each learner, determining the verification result that is the same as the marking result as a target result;

counting a first quantity of the target results, and counting a second quantity of the verification results;

calculating a ratio of the target results in the verification results according to the first quantity and the second quantity; and determining the calculated ratio as the correct rate of each learner.

13. The electronic device according to claim 9, wherein the at least one processor constructs the plurality of learners by:

constructing latent spaces with a plurality of sizes;

obtaining a plurality of operation results by performing operations according to each of the plurality of sizes and an image size of each detecting block;

for each of the plurality of sizes, constructing a corresponding number of hidden layers as an encoder according to the plurality of operation results, and constructing a corresponding number of operation layers as a decoder according to the plurality of operation results; and generating a learner according to the encoder, the latent space and the decoder corresponding to each of the plurality of size, and obtaining the plurality of learners.

14. The electronic device according to claim 13, wherein the at least one processor obtains the plurality of reconstructed image blocks by inputting each of the plurality of detecting blocks into the corresponding multi-scale autoencoder model by:

obtaining a feature vector by inputting each detecting block into the hidden layer of the corresponding multi-scale self-encoder model for feature extraction;

determining the obtained feature vector as an input vector of a next hidden layer;

determining a feature vector output by a last hidden layer as a potential vector corresponding to the image to be detected;

obtaining a reconstructed vector output by each operation layer by inputting the potential vector into the operation layer of the corresponding multi-scale autoencoder model, determining the reconstruction vector output by each operation layer as being the input vector of a next operation layer; and obtaining the plurality of reconstructed image blocks by performing conversion on the reconstruction vector output by the last operation layer.

15. The electronic device according to claim 9, wherein the at least one processor calculates the reconstruction error value between each reconstructed image block and the corresponding detecting block by:

obtaining a difference image by performing a subtraction operation between a pixel value of each pixel point in each reconstructed image block and a pixel value of the corresponding pixel point in the detecting block;

obtaining a binarized image by binarizing the difference image;

extracting the pixel points whose pixel value equals a configuration value from the binarized image as a target area; and obtaining the reconstruction error value by calculating an area of the target area.

16. The electronic device according to claim 9, wherein the at least one processor generates the detection result of the product contained in the image to be detected based on the reconstruction error value corresponding to each detecting block by:

comparing the reconstruction error value corresponding to each detecting block with a second preset value;

if the reconstruction error value corresponding to a certain detecting block is greater than the second preset value, determining the certain detecting block as a target image block;

locating a position of the target image block in the image to be detected as a position of a defect; and determining that the product to be detected is defective and outputting the position of the defect.

17. A non-transitory storage medium having instructions stored thereon, when the instructions are executed by a processor of an electronic device, the processor is caused to perform an image defect detection method, wherein the method comprises:

acquiring an image to be detected, a defective image, and a non-defective image;

dividing the image to be detected into a plurality of detecting areas, generating a detection accuracy value for each of the plurality of detecting areas based on the defective image and the non-defective image, and obtaining a plurality of detection accuracy values;

constructing a plurality of learners;

selecting an autoencoder for each of the plurality of detection accuracy values from the plurality of learners;

obtaining a multi-scale autoencoder model corresponding to each of the plurality of detecting areas by training the corresponding autoencoder based on the non-defective image;

dividing each of the plurality of detecting areas into a plurality of detecting blocks, and obtaining a plurality of reconstructed image blocks by inputting each of the plurality of detecting blocks into the corresponding multi-scale autoencoder model;

calculating a reconstruction error value between each of the plurality of reconstructed image blocks and the corresponding detecting block;

generating a detection result of a product contained in the image to be detected based on the reconstruction error value corresponding to each detecting block.

18. The non-transitory storage medium according to claim 17, wherein generating the detection accuracy value for each of the plurality of areas based on the defective image and the non-defective image comprises:

dividing the defective image into a plurality of defective areas, and dividing the non-defective image into a plurality of non-defective areas;

dividing each of the plurality of defective areas into a plurality of defective blocks; and dividing each of the plurality of non-defective areas into a plurality of non-defective blocks;

for each of the plurality of defective areas, calculating a similarity value between each of the plurality of defective blocks and a corresponding non-defective block and obtaining a plurality of similarity values;

calculating an average value of the plurality of similarity values, and determining the calculated average value as being a target average value corresponding to each defective area, therefore obtaining a plurality of target average values each of which is corresponding to one of the plurality of defective areas;

generating a parameter range of each defective area based on the target average value corresponding to each defective area; and determining the parameter range of each defective area as the detection accuracy value of a corresponding detecting area.

19. The non-transitory storage medium according to claim 18, wherein selecting the autoencoder for each detection accuracy value from the plurality of learners comprises:
- determining each defective block in each defective area and the corresponding non-defective block in the non-defective area as being test image blocks;
- obtaining a marking result of each of the test image blocks;
- obtaining a plurality of first reconstructed image blocks by inputting each of the test image blocks in each of the plurality of learners;
- calculating an error value between each of the first reconstructed image blocks and the corresponding test image block;
- generating a verification result according to the error value and a first preset value; obtaining a comparison result by comparing the verification result with the marking result;
- calculating a correct rate of each learner according to the comparison result;
- selecting the learner corresponding to a highest correct rate as the autoencoder corresponding to each defective area; and
- determining the autoencoder corresponding to each defective area as the autoencoder of the detection accuracy value corresponding each defective area.

20. The non-transitory storage medium according to claim 17, wherein calculating the correct rate of each learner according to the comparison result comprises:
- for each learner, determining the verification result that is the same as the marking result as a target result;
- counting a first quantity of the target results, and counting a second quantity of the verification results;
- calculating a ratio of the target results in the verification results according to the first quantity and the second quantity; and
- determining the calculated ratio as the correct rate of each learner.

* * * * *